United States Patent
Demazeau et al.

(10) Patent No.: US 11,907,769 B2
(45) Date of Patent: Feb. 20, 2024

(54) METHOD AND A SYSTEM FOR MANAGING THE COMPUTING RESOURCES IN DATA REGIONS

(71) Applicant: AMADEUS S.A.S., Biot (FR)

(72) Inventors: Michel Demazeau, Nice (FR); Jacques Bonaud, Cagnes-sur-Mer (FR); Jean Michel Collomb, Opio (FR); Vincent Boulineau, Antibes (FR)

(73) Assignee: AMADEUS S.A.S., Biot (FR)

( * ) Notice: Subject to any disclaimer, the term of this patent is extended or adjusted under 35 U.S.C. 154(b) by 298 days.

(21) Appl. No.: 17/374,741

(22) Filed: Jul. 13, 2021

(65) Prior Publication Data

US 2022/0197708 A1 Jun. 23, 2022

(30) Foreign Application Priority Data

Dec. 21, 2020 (EP) .................................... 20306646

(51) Int. Cl.
*G06F 9/50* (2006.01)

(52) U.S. Cl.
CPC ...... *G06F 9/5077* (2013.01); *G06F 2209/505* (2013.01); *G06F 2209/506* (2013.01); *G06F 2209/508* (2013.01)

(58) Field of Classification Search
CPC ............. G06F 9/5077; G06F 2209/505; G06F 2209/506; G06F 2209/508
See application file for complete search history.

(56) References Cited

U.S. PATENT DOCUMENTS

| | | | | |
|---|---|---|---|---|
| 9,749,207 B2* | 8/2017 | Liu | ..................... | G06F 11/3409 |
| 9,779,015 B1* | 10/2017 | Oikarinen | ............... | G06F 12/02 |
| 10,110,450 B2* | 10/2018 | Cook | .................. | H04L 41/5096 |
| 10,397,255 B1* | 8/2019 | Bhalotra | ............. | H04L 63/1425 |
| 10,601,679 B2* | 3/2020 | Lynar | .................. | H04L 67/1008 |
| 11,108,629 B1* | 8/2021 | Cahyadi | .............. | G06F 9/45558 |
| 2013/0204991 A1* | 8/2013 | Skjolsvold | ............ | G06F 9/5083 709/223 |
| 2017/0264493 A1* | 9/2017 | Cencini | ............... | H04L 67/1023 |
| 2021/0144517 A1* | 5/2021 | Guim Bernat | ...... | H04L 41/0869 |
| 2022/0197773 A1* | 6/2022 | Butler | ..................... | G06F 9/505 |
| 2022/0232090 A1* | 7/2022 | Vinayakumar | ..... | G06F 11/3409 |
| 2023/0022079 A1* | 1/2023 | Vrudhula | ............ | G06F 9/45545 |

FOREIGN PATENT DOCUMENTS

| | | |
|---|---|---|
| CN | 112099918 A | 12/2020 |
| WO | WO-2017004547 A1 | 1/2017 |

OTHER PUBLICATIONS

Toffetti, Giovanni, et al. "An architecture for self-managing microservices." Proceedings of the 1st International Workshop on Automated Incident Management in Cloud, New York. Apr. 21, 2015.

* cited by examiner

*Primary Examiner* — Benjamin C Wu
(74) *Attorney, Agent, or Firm* — Perry + Currier

(57) ABSTRACT

The present invention describes a system and a method for dynamically optimising the computing resources allocated to a client application in different data regions of one or more service providers. A number of monitoring modules are provided in each data regions, which are configured to collect operational information from each data region, which is communicated to the other data regions. As such, all data regions are aware of the operational environment of the other data regions.

17 Claims, 8 Drawing Sheets

METHOD AND A SYSTEM FOR MANAGING THE COMPUTING RESOURCES IN DATA REGIONS

CROSS-REFERENCE TO RELATED APPLICATION

This application claims priority to European Patent Application No. 20306646.9, filed Dec. 21, 2020, the contents of which are incorporated herein by reference.

FIELD

The present invention relates to a method and a system for managing the allocation of computing resources to a client application running on virtual machines instantiated in one or more data centre regions.

BACKGROUND

Over the past few years, the distribution of services/applications through a cloud computing platform has become mainstream. The main advantage of cloud computing is that it abstracts most of the concerns relating to the physical hardware and/or software resources, thus enabling users to concentrate on their core business instead of focusing on the maintenance and deployment of data centres. The cloud computing model is based on providing a user with access to physical computing resources on a pay-as-you-go basis, whereby the user pays for the started computing resources to run the services/applications on the cloud computing platform. As the demand for the cloud operated services/applications changes, the underlying physical resources can be dynamically scaled to meet the computing needs of the cloud services/applications at any given time.

Operating a data centre can be highly expensive, and thus to make the cloud computing model profitable, cloud computing providers, also referred to as Infrastructure as a Service (IaaS) providers, are using the concept of virtualisation to allow multiple users to share the same underline physical computing resources. Virtualisation enables the partition of the hardware and/or software resources into isolated Virtual Machine (VM) instances, which can be assigned to a user on demand to run applications and/or services on the cloud computing platform.

In general, the quality of service and cost for running a cloud service and/or application on the cloud computing platform is highly dependent on the physical computing resources consumed by the allocated VM instances. Therefore, it is essential to efficiently manage the allocation of physical resources according to the demand experienced by the service and/or application, to maintain a balance between quality of service and cost.

In existing solutions, the allocation of physical resources is generally based on monitoring the resource utilisation, e.g. CPU utilisation, of each VM instance, running the cloud service and/or application. The utilisation of the computing resources allocated to each VM instance would vary according to the demand of the service and/or application hosted therein. However, monitoring the utilisation of each VM instance may lead to a delayed response in scaling the computing resources to meet variation in user demand, which may cause the VM instances to be operated outside of their target value range for a period of time, leading to a reduced level of service and/or higher cost.

SUMMARY

One of the main concerns associated with the use of cloud computing platforms is the need to ensure that the allocated physical resources are dynamically adjusted to meet traffic variations and/or changes to the underline Infrastructure such as changes to the availability of computing resources, or pricing. The present invention may provide a method and a system for dynamically managing the computing resources allocated to a client application in one or more data centre regions.

According to a first aspect of the present invention, a system is provided for managing the allocation of comparing resources to a client application in more data regions of one or more service provider. Each data region comprising a plurality of virtual machine clusters, each comprising a number of VM instances configured for running at least a component of the client application, the system comprising: a plurality of monitoring modules communicatively coupled with one another, each monitoring module is associated with a VM duster in a data region and is configured to monitor a set of operational parameters of the data region operating environment and to collect corresponding operational information from the service provider; wherein one of the monitoring modules in each data region is selected as a local leader, the local leader is configured to communicate the operational information to the local leaders of the other data regions, wherein one of the local leaders is selected as a global leader, the global leader is configured for synchronising the communication of information between the local leaders and synchronise write operations to a shared operational database configured to store the operational information communicated by each of the local leaders, and a set of optimisation constraints identifying target values of the operational parameters; wherein, upon detecting a change in data region operating environment cause at least one of the operational parameters to violate at least one of the optimisation constraints, each local leader is configured to generate an optimisation proposal comprising a set of actions to be performed by one or more of the local leaders for optimising the allocation of computing resources in the different data regions, the optimisation proposal is submitted to a vote to the local leaders; and wherein, upon the optimisation proposal is accepted by a majority of the local leaders, each local leader identified in the optimisation proposal is configured to perform the corresponding actions in the corresponding data region, otherwise, if the optimisation proposal is rejected, then a new optimisation plan is generated.

According to embodiments of the present invention, the monitoring module comprises an optimisation module configured for generating an optimisation plan based on at least the set of optimisation constraints.

According to embodiments of the present invention, the set of optimisation constraints comprise target availability of computing resource, target pricing of the computing resources, target distribution of computing resources between different regions and/or different VM clusters.

According to embodiments of the present invention, the optimisation module is configured to obtain the information associated with the optimisation constraints from the shared operational database.

According to embodiments of the present invention, at least one of the data regions is associated with a different service provider.

The system of the present invention enables the dynamic allocation of computing resources in different data regions, depending on the needs of the client application and the changes occurring in the data region operating environment. The reallocation of computing resources between different data regions, which may belong to a different service provider, is realised by establishing the communication of information between the local cluster using the global leader of the global cluster. As such, operational information collected from each data region is shared between the monitoring modules, which enables the local leaders of the data regions to generate optimisation proposal for the reallocation of computing resources. The operational information collected is associated with the monitored operating parameters of the corresponding data region. For example, the operational information collected may include, but not limited to computing resource availability, the architecture of the data region, e.g. number of VM clusters and VM instances in each cluster, and pricing of the computing resources. Therefore, with the system of the present invention, it is possible to reallocate computing resources when needed, thus ensuring the continuous operation of the client application, and further ensuring that the price of the computing resources is maintained within a predetermined threshold. The optimisation proposal is generated by considering the operational information collected from the different data regions, and also by taking into account a set of optimisation constraints. The optimisation constraints may be defined by the user and/or the client application. For example, the optimisation constraints may include, but not limited, to target availability of computing resource, target pricing of the computing resources, target distribution of computing resources between different regions and/or different VM clusters, and the like. Furthermore, the optimisation proposal may be generated based on other information stored in the shared operational database such as historical performance information and pricing fluctuation of data regions, and the like.

According to embodiments of the present invention, each monitoring module comprises a resource watching module configured to communicate with the cloud service provider to collect the operational information associated with the monitored operational parameters, and accordingly convert the data format of the collected operational information to a common data format accessible by each of the plurality of monitoring modules.

The resource watcher module is configured to retrieve the operational information from the corresponding service provider. For example, the resource watcher module may communicate, via an application programming interface (API) or similar, with the service provider to retrieve the operational information. Accordingly, the resource watcher module is configured to convert, when required, the data format of the retrieved operational information to a standardised data format that is accessible and understandable by the plurality of monitoring modules. As such, the information shared between the monitoring modules can be accessed via the shared operational database.

According to embodiments of the present invention, each monitoring module comprises a resource action module configured to communicate with the corresponding service provider to perform the actions identified in the optimisation plan. For example, the actions identified in the optimisation plan comprise at least one of allocation new resources, reallocation of computing resources, increase or decrease capacity in a VM cluster, or replace non-performing virtual machine instances in a VM cluster. Once an optimisation proposal has been accepted, it is propagated and/or communicated to at least the local leaders of the data regions associated with the data regions involved in the optimisation of resources. The resource optimisation may be performed in a single data region or across multiple data regions, e.g. sharing of computing resources. The resource action module of the corresponding local leaders involved in the optimisation proposal may communicate with one another to synchronise the timing of the actions required to be performed so that the operation of the client application is maintained unaffected. In general, when a new optimisation plan is accepted the associated steps are stored in the shared database with the identified order to be executed, the status, and the owner of each step. Local leaders perform tasks they own and update status in the shared database. Synchronization occurs through each owner checking the status of the parent/previous task in the shared database. Each resource action module is configured to communicate with the service provider, e.g. via an API, to perform the actions identified in the optimisation plan.

According to embodiments of the present invention, monitoring modules of a data region are organised into a local duster, and the local leaders of the data regions are organised in a global duster.

According to embodiments of the present invention, the communication between the monitoring modules in the local dusters and the global duster is governed by a distributed consensus protocol.

According to embodiments of the present invention, the consensus protocol is any one of Paxos, raft, or an equivalent consensus algorithm.

According to embodiments of the present invention, each local duster comprises at least three monitoring modules, each associated with a corresponding VM duster.

According to embodiments of the present invention, each monitoring module comprises a clustering module configured to establish communication with the other monitoring modules in the local and/or global duster for the exchange of information and implementation of the selected distributed consensus algorithm.

The system of the present invention is configured to organise the monitoring modules into a local duster, each having a local leader, a global duster comprising the local leaders from each data region. As a result, at each level, actions may be taken and performed by one monitoring module, thereby greatly simplifying the communication between data regions and control over the changes made to a data region. As the monitoring modules are identical, each one may be designated to act as a local leader and/or as a global leader. The local leaders and global leaders may be changed periodically. For example, the local and global leaders may be established according to a distributed consensus protocol, e.g. Paxos, raft, or similar. The communication module is configured to implement the selected distributed consensus protocol with the other monitoring modules of the local and global dusters. Through the communication module, the local leaders communicate with one another for the exchange of information, e.g. optimisation proposal, operational information, and the like.

According to a second aspect of the present invention, a method is provided for managing the allocation of computing resources to a client application in data regions of one or more service providers. Each data region comprising a plurality of virtual machine clusters, each comprising a number of VM instances configured for running at least a component of the client application, the method comprising: providing a plurality of monitoring modules communicatively coupled with one another, each monitoring module is associated with a VM cluster in a data region and is configured to monitor a set of operational parameters of the data region operating environment and to collect corresponding operational information from the service provider; selecting one of the monitoring modules in each data region as a local leader, the local leader is configured to communicate the operational information to the local leaders of the other data regions; selecting one of the local leaders as a global leader, the global leader is configured for synchronising the communication of information between the local leaders and synchronise write operations to a shared operational database configured to store at least the operational information communicated by each of the local leaders and a set of optimisation constraints identifying target values for the operational parameters; wherein, upon detecting a change in data region operating environment cause at least one of the operational parameters to violate at least one of the optimisation constraints, each local leader is configured to generate an optimisation proposal comprising a set of actions to be performed by one or more of the local leaders for optimising the allocation of computing resources in the different data regions, the optimisation proposal is submitted to a vote to the local leaders; and wherein, upon the optimisation proposal is accepted by a majority of the local leaders, each local leader identified in the optimisation proposal is configured to perform the corresponding actions in the corresponding data region, otherwise, if the optimisation proposal is rejected, then a new optimisation plan is generated.

BRIEF DESCRIPTIONS OF THE DRAWINGS

Embodiments are described with reference to the following figures.

DETAILED DESCRIPTION

The present invention will be illustrated using the exemplified embodiments shown in FIGS. 1 to 8, which will be described in more detail below. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention. Furthermore, while the invention has been described with references to a particular system and/or a method for managing the allocation of computing resources to a client application, it should be understood by those skilled in the art that changes in form and details may be made to facilitate other types of method and/or systems in related fields without departing from the scope of the invention. In some embodiments, the method comprises method steps corresponding to any one of the system functions for managing the allocation of computing resources set out herein.

Figure 1:
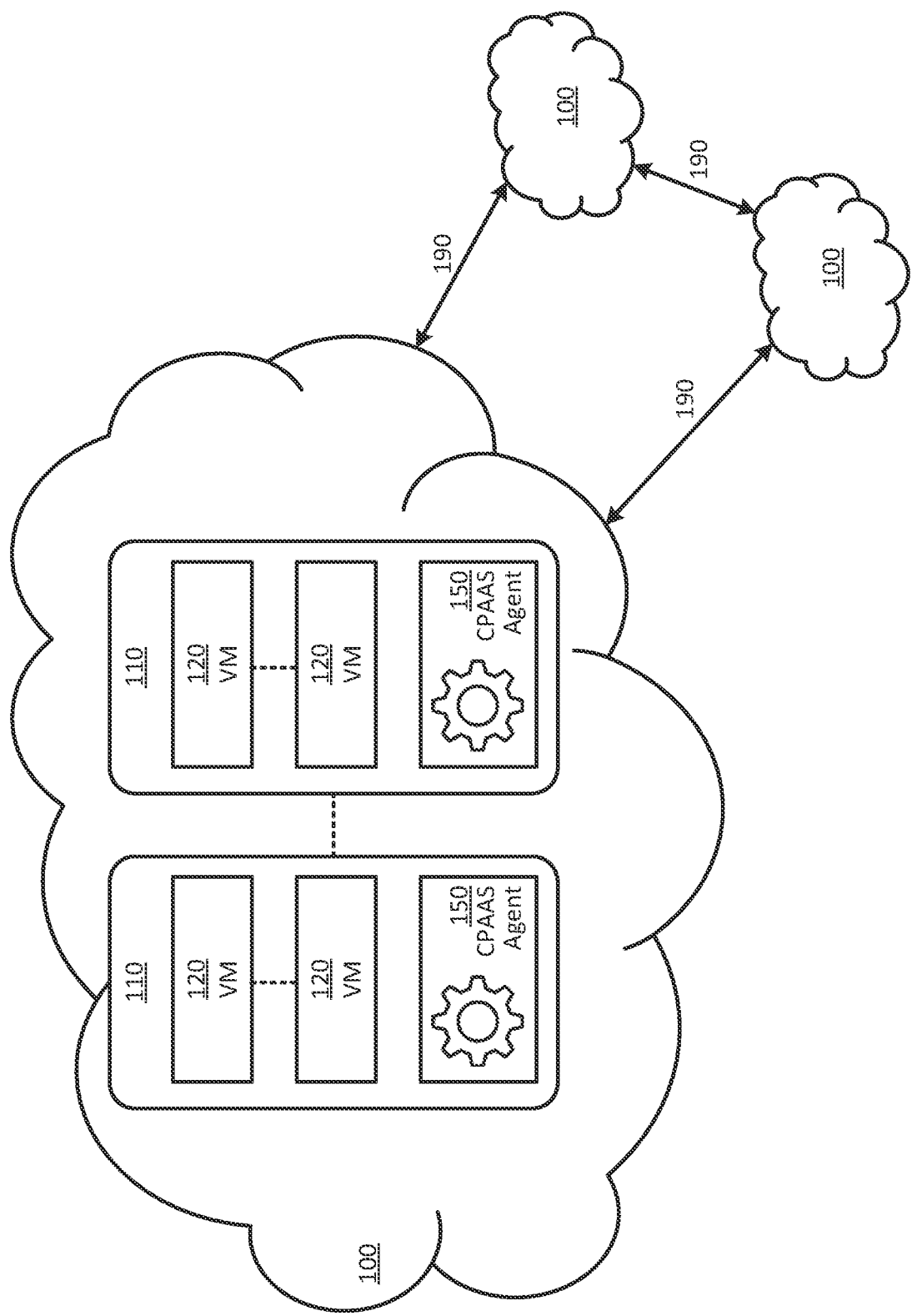
FIG. 1 shows an example of a data region comprising a plurality of availability zones according to embodiments of the present invention.

FIG. 1 shows an exemplified implementation of a system for managing the computing resources allocated to a client application according to embodiments of the present invention. The management of computing resources may be performed continuously, or periodically, based on the real availability of requested computing resources, i.e. virtual machine instances on the Cloud provider and a resource cost parameter deduced from the pricing model of the Cloud provider. As such, the system of the present invention may handle capacity reallocation in different situations, e.g. when some virtual machine (VM) types become unavailable during operation of the client application or if the price of a virtual machine type has changed. FIG. 1 shows an implementation where data regions 100 belonging to one or more cloud providers are communicatively coupled to one another. The term data region is usually linked to the geographical location of the data centre. However, for the purpose of the present invention the term data region may broadly define an independent region comprising one or more VM dusters 110, also referred to hereinafter as availability zones (AZ), that is not necessarily linked to a geographical location. As shown in FIG. 1, each data region 100 may comprise one or more availability zones (AZ) 110, each comprising a plurality of virtual machine (VM) instances 120. In general, an availability zone (AZ) 110 is an isolated location within a data centre region 100 from which public cloud services originate and operate. The number of VM instances 120 in an AZ 110 is scalable according to the traffic of the client application. In each availability zone 110 a dedicated monitoring module 150, also referred to hereafter as a cloud provider as a service (CPAAS) agent 150, is provided to gather operational information of the corresponding data region 100 and share the collected operational information with other CPAAS agents 150 that may belong to the same or different data region 100. The data regions 100 are connected to one another via communication links 190 for the exchange of information between the different data regions 100. As such, the CPAAS agents 150 are communicatively coupled with one another via the communication links 190 for the exchange of operational information between different data regions 100. In this way, each CPAAS agent 150 is aware of the operating environment of the other data regions 100. Each CPAAS agent 150 may run in one or more of the VM instances 120 of the corresponding VM cluster that the CPAAS agent 150 is assigned to monitor.

Figure 2:
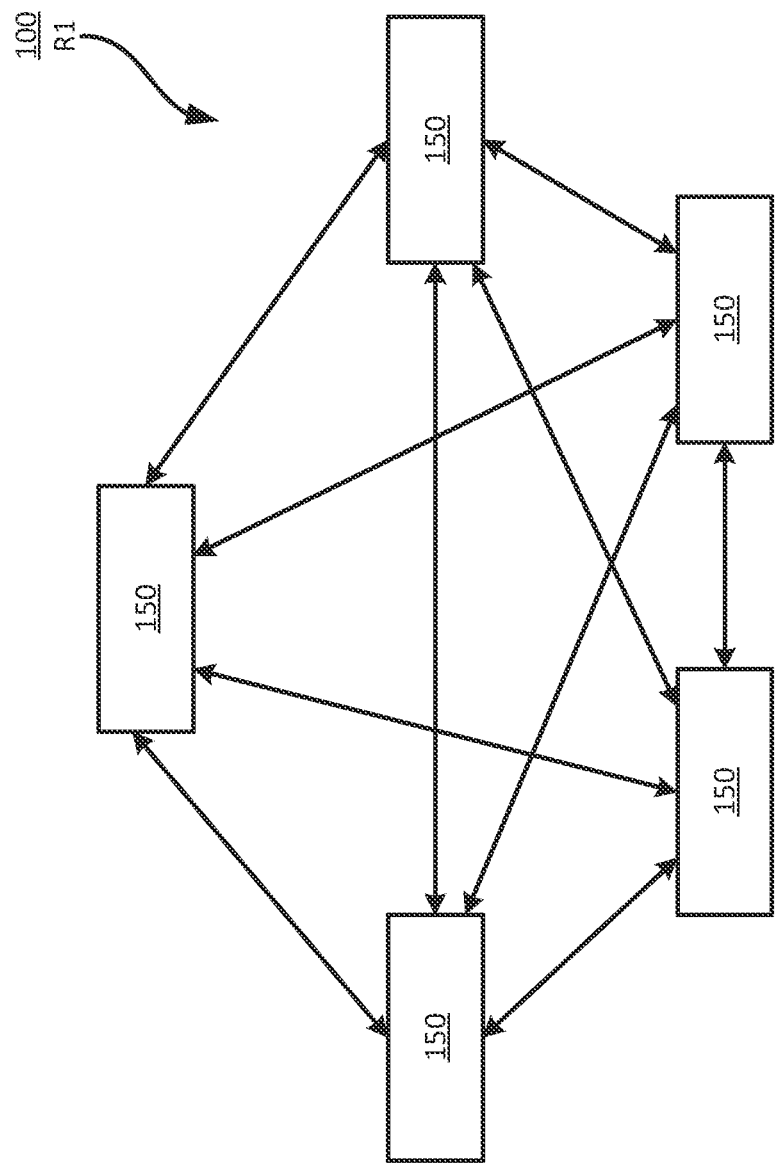
FIG. 2 shows an example of a communication network between monitoring modules in a data region according to embodiments of the present invention.

Each CPAAS agent 150 is associated with a VM cluster 120 of a data region 100 and is configured to monitor a set of operational parameters of the data region 100 operating environments. Each CPAAS agent 150 is configured to communicate with the corresponding service provider to retrieve and collect the operational information associated with the data region 100. For example, the CPAAS agents 150 may retrieve, via an application programming interface (API), the information associated with the Infrastructure of data region 100 from the Infrastructure as a Service (IaaS) provider, e.g. the number of availability zones (AZ) 100, pricing of computing resources for each data region 100, availability of computing resources, and the like. All CPAAS agents 150 have an identical architecture and functionality, and as such may be interchangeably used to fulfil different roles in the system of the present invention. For example, a CPAAS agent 150 of a data region 100 may be selected as a local leader 1150 (see FIG. 3) of a local cluster of interconnected CPAAS agents 150 of a data region 100 "R1", as shown in FIG. 2. Similarly, a CPAAS agent 150 selected as a local leader 1150 may also be appointed as a global leader 11150 (see FIG. 4) of a global cluster of interconnected local leaders 1150 from different data regions 100.

For example, a CPAAS agent 150 selected as a local leader 1150 is responsible for collecting operational information from the data region 100, communicating the operational information to the other CPAAS agents 150 in the local and global clusters, and performing actions in the data region 100 for the allocation of computing resources. For example, a CPAAS agent 150 elected as a global leader 11150 is to configured to receive the operational information communicated by each local leader 1150 and accordingly synchronise the storage of the operational information to a shared operational database that is accessible by each CPAAS agent 150. Therefore, the global leader 11150 is configured to ensure the consistency of the shared operational database. In other words, the global leader 11150 ensures that the shared database is compliant with the ACID properties, i.e. Atomicity, Consistency, Isolation, and Durability.

The shared operational database may store a range of information that may be used by the CPAAS agents 150 for the management and optimisation of the computing resources allocated to a client application. For example, the operational database may store the operational information from each data regions, optimisation constraints, proposals for optimising the computing resources, pricing models, and the other information.

FIG. 2 shows an example of a local cluster of CPAAS agents 150 in a data region 100. The CPAAS agents 150 are exchanging information with one another and are configured to electing a local leader CPAAS agent 1150 for the region. Each CPAAS agent 150 in the local cluster is configured to collect operational information associated with their corresponding availability zone (AZ) 110 and/or the data region 100, and rely on their Local Master agent to propagate the operational information, which may include but is not limited to:
  a. an identification of the cloud provider of the region 100.
  b. pricing model of the AZ 110, if the Cloud provider has to implement a pricing model at a regional level. If not the pricing model will be the one for the region.
  c. The topography of the region—number of AZ 110 and VM instances 120 per AZ 110.
  d. The current Infrastructure of the AZ in the region.

As the CPAAS agents 150 in the data region 100 may have to elect a leader for the region it is preferable, but not essential, for reasons of resiliency, to have at least three CPAAS agents 150 in the data region 100, to ensure a majority can occur during an election even after the failure of one agent 150. For example, the election of a local leader 1150 may be performed based on a distributed consensus protocol, e.g. Paxos, raft, etc. Similarly, the local leader may be selected by a user and/or a process. Furthermore, each CPAAS agent 150 may take turns in the role of the local leader 1150.

Figure 3:
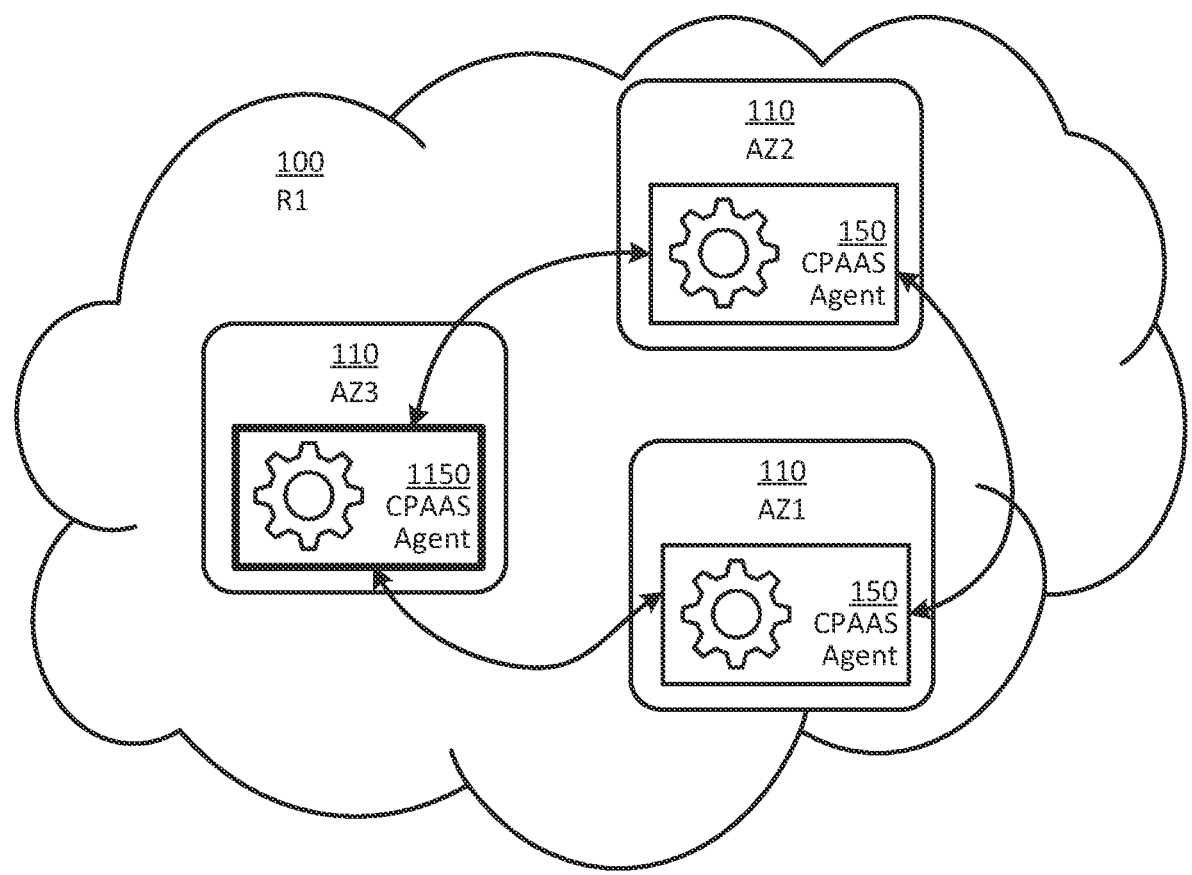
FIG. 3 shows an example of a local duster of monitoring modules in a data region having selected a local leader according to embodiments of the present invention.

An embodiment of a local cluster with a local leader 1150 is represented in FIG. 3, where the CPAAS agent 150 of the AZ3 VM cluster 110 is elected as local leader 1150 for the local cluster of the R1 data region 100, shown as including three VM clusters 110, namely AZ1, AZ2, and AZ3.

The principle presented in FIG. 3 for the local cluster is applicable across data regions 100, wherein the local leaders 1150 of each local cluster are configured to elect a representative Global CPAAS leader 11150 for the global cluster of the data regions.

Figure 4:
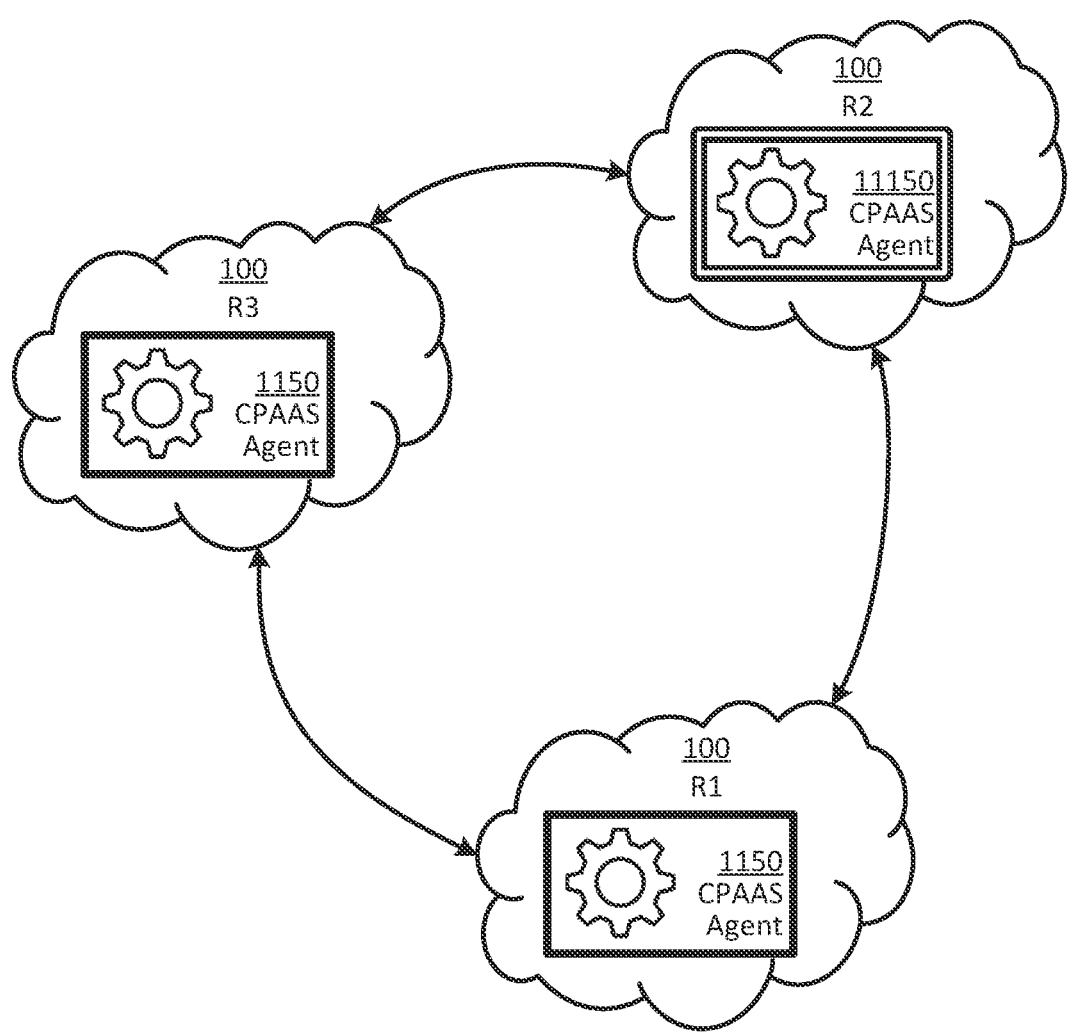
FIG. 4 shows an example of a global cluster comprising local leaders of different data regions according to embodiments of the present invention.

FIG. 4 represents an embodiment with three regions remaining on different Cloud providers that have elected a CPAAS agent 150 from the region R2 as the leader of the global cluster. In this way, information may be exchanged between the different data regions 100. As previously discussed, the global leader 11150 may be responsible for synchronising the storage of information communicated from the different local leaders 1150 in the shared operational database, thereby enabling all CPAAS agents 150 to access the same information.

Figure 5:
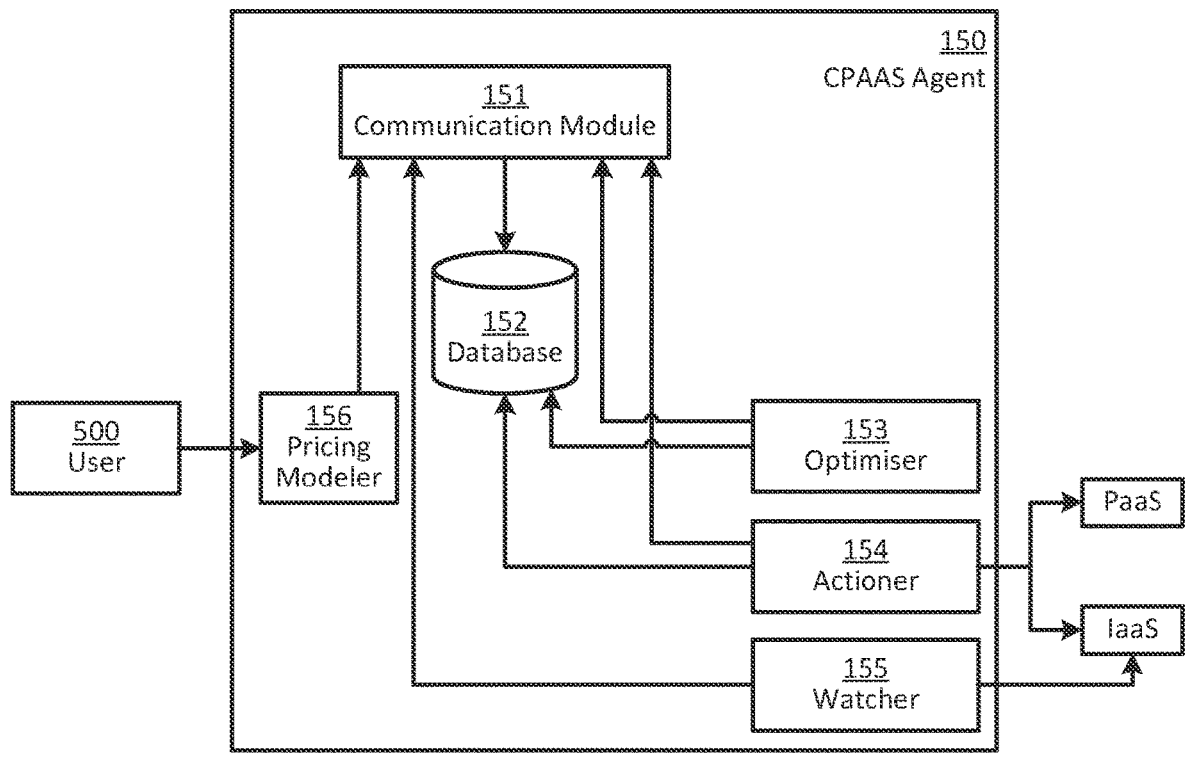
FIG. 5 shows an exemplified architecture of a monitoring module according to embodiments of the present invention.

FIG. 5 shows an exemplified architecture of the CPAAS agent 150 according to embodiments of the present invention. Each CPAAS agent 150 may be provided with a communication module 151, which may be configured to establish communication with the other CPAAS agents 150 for the exchange of information and to implement the distributed consensus protocol with the local and/or global clusters. Information received from other CPAAS agents 150 and/or from the global leader 11150 are stored in the database 152, which may be a distributed shared database accessible by each CPAAS agent 150. As previously discussed, the consistency of the database 152 is maintained by the global leader 11150, which is considered to synchronise write operations to the database 152, thus ensuring that each CPAAS agent 150 accesses the same content. An optimisation module 153 may be provided for generating, based on the information stored in the database 152, optimisation plans for optimising the resources allocated to the client application. The generation of an optimisation plan may be triggered by a change in the data region operating environment causing at least one of the operational parameters to violate at least one of the optimisation constraints. For example, a reduction in the number of available VM instances 120 in the corresponding region, would trigger the optimiser to generate a new optimisation plan for reallocating the resources so as to ensure the continuity of the client application once the optimisation plan is generated submitted to the communication module 151 for communication to the other CPAAS agents 150 in the local and global clusters. The optimisation plan may identify the actions to be performed by one or more of the CPAAS agents in one or more of the data regions for the reallocation of computing resources.

According to embodiments of the present invention, the optimisation module 153 may generate the optimisation plan based on a set of constraints. For example, the optimisation module may generate the optimisation plan based on information retrieved from the shared database 132. The information may include, but not limited to, current data, historical data, and target configuration. For example, the current data may comprise the price per VM machine type, the number of requested VMs versus the available VMs, the target VM size of the data region. Similarly, the historical data may comprise the number of moves made to the VM instances within a predetermined time in a VM cluster and/or data regions, the scoring of each VM instance and/or service provider identifying whether the performance of the VM instance and/or service provider against a target performance value. The target configuration information may comprise a target configuration of the type of VM instances in each data region and/or service provider, e.g. x % of certain type of VM instances per data regions, whereby x is a value. Furthermore, the target configuration information may comprise allowable deviation range from the target configuration, which may be expressed as a percentage e.g. x % from the target configuration, where x is the desired value. The optimisation module 153, based on at least the above information may use a cost optimisation function to determine the distribution of the computing resources between the data regions and/or service provider.

For example, the cost optimisation function may be expressed as follows:

$$\sum^{i} (P(i) * x^i) + (MissWeight * X^i_{missing}) +$$
$$(x^i - X^i_{target}) + L(x^i, X^i_{current}, lastTime)$$

In the expression above, i represents the price of each VM in each data region; $(P(i)*x^i)$ represents the cost associated with the allocation of VMs in each region; (MissWeight*$X_{missing}^i$) represents the missing VMs from the target configuration for operating the client application. The "MissWeight" parameter is adjustable. The expression ($x^i - X_{target}^i$) represents the ideal target value of VM instances; $L(x^i, X_{current}^i, lastTime)$ represents the number of VM instances that should not be moved within a predetermined time, which is defined by the parameter "LastTime". The value L is an absolute function of the product (xi–Xi current)*lastTime.

The above formula may also be expressed as:

$$\sum^{i} (P(i) * x^i) + (MissWeight * X^i_{missing}) +$$
$$(x^i - X^i_{target}) + (abs(x^i, X^i_{current}) * lastTime)$$

In the formula above, the expression L of the earlier formula has been replaced by $(abs(x^i - x_{current}^i)*lastTime)$.

Based on the above cost optimization formulas, the optimization module may provide one or more solutions for distributing the computer resources between the data regions 100. Each solution may be expressed in the form of an optimization plan. Therefore, from the above the costs oprimisation function, which is the is the result of the sum of three parameters, a first parameter proportional to the price associated with the use of all virtual machines, a second parameter proportional to the difference between the actual number of virtual machines and the expected number of virtual machines, and a third parameter which is proportional to the rate of change of the number of virtual machines.

The optimisation plan may be submitted to a vote to the CPAAS agents 150, and upon acceptance of the optimisation plan by the majority of the CPAAS agents 150 in the local and global clusters, the plan is implemented by an actioner module 154 of the local leaders 1150 associated with the data regions 100 identified in the optimisation plan. The actioner 154 is configured to communicate with the corresponding Cloud service provider, e.g. Infrastructure as a Service (IaaS) and Platform as a Service (PaaS) providers, of the data regions involved in the optimisation to coordinate the allocation of resources. The monitoring module is provided with a resource watching module 155 configured to communicate with the cloud service provider to collect the operational information of the monitored operational parameters associated with data regions. The resource watcher module 155 is configured to convert when needed, the data format of the collected operational information to a common data format accessible by each of the plurality of monitoring modules. As such, the data stored in the database 152 is accessible by each of the CPAAS agents 150 of the different data regions. It is common for data regions of different providers to use different data format, which may impede the communication between the data regions. Therefore, the provision of the resource watcher module 155 enables information to be communicated consumed by the CPAAS agents 150 of different data regions. A pricing modeler 156 may be further provided, which is configured to collect information from a user 500 and accordingly determine the cost of the resources used by the client application. In general, as all the CPAAS agents 150 are identical and communicate information with one another, the Pricing Modeler 156 would procure a generic view of the cost for the computing resources independently of the cloud provider. When a change is made on the pricing model for a region, the Pricing Modeler 156 will provide a new model to the communication module 151 in order to be propagated to the global agent 11150 for distribution to the other CPAAS agents 150.

Figure 6:
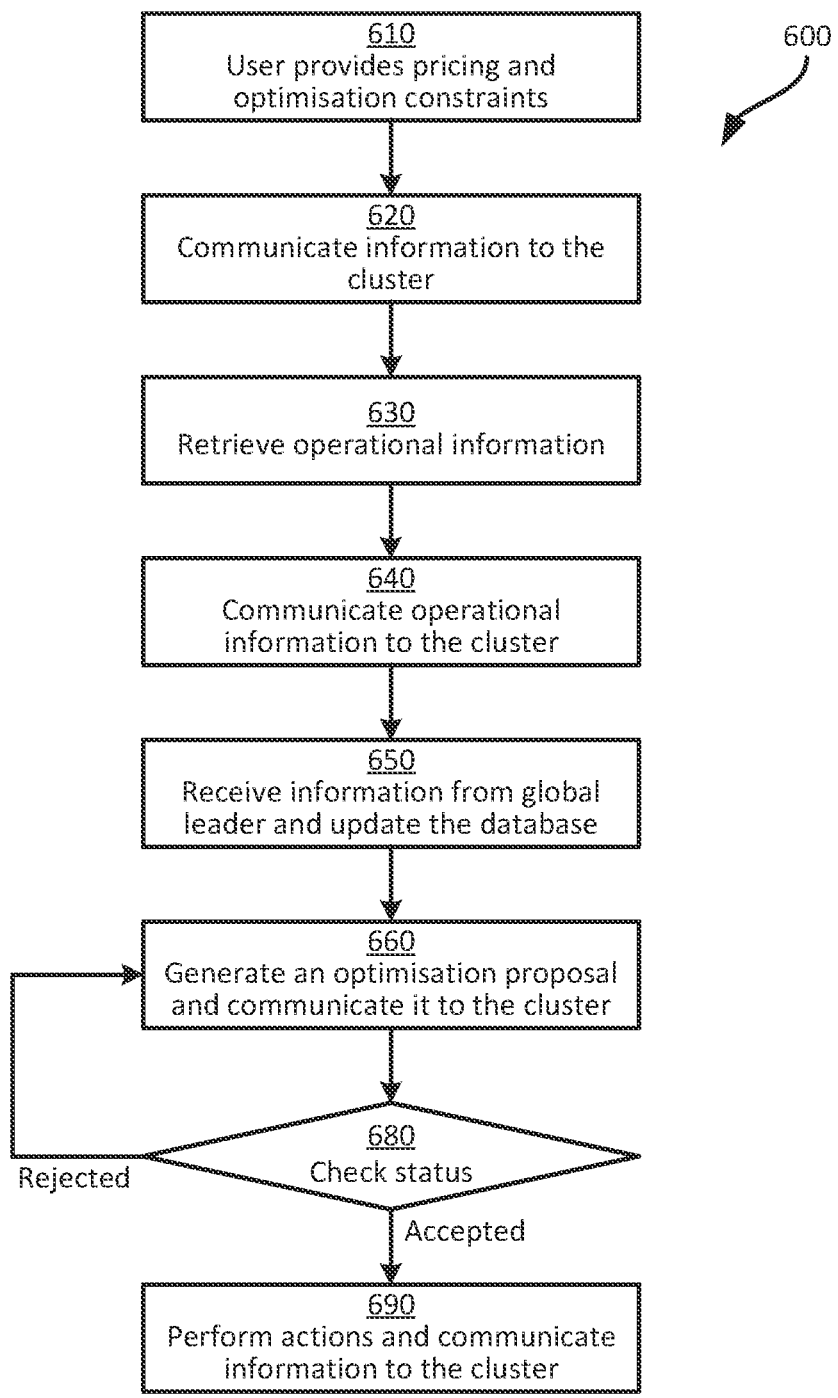
FIG. 6 shows an exemplified operation of monitoring module being selected as a local leader according to embodiments of the present invention.

In general, all CPAAS agents 150 are configured to watch resources in their data region, compute optimal plan when something has changed and submit new resources allocation to a vote. They all share the same data, which is stored in the database 152:
 a. Pricing model changes
 b. Infrastructure changes
 c. Optimisation Action Plan
 d. Actions performed FIG. 6 shows an exemplified method 600 of a CPAAS agent 150 acting as a local leader 1150 in a data region. At step 610, a user 500 entered a set of pricing and optimisation constraints, e.g. the target cost for the computing resources, the target availability and distribution of resources between the different regions, and the like. The pricing modeler 156 generates a pricing model, which is distributed, via the communication module 151, to the other CPAAS agents 150 at step 620. The local leader 1150, then may retrieve the operational information via the resource watcher module 154 at step 630, which is communicated to the CPAAS agents via the global agent at step 640. The global leader 11150 communicates the information to the local leaders 1150, where the information is stored in the database 152, at step 650. The optimisation module 153, upon detecting a change in the operating parameters based on the information retrieved from the database 152 generates at step 660 an optimisation plan identifying how the computing resources are to be allocated in the different data regions 100 using the cost optimisation formulas presented above. The optimisation plan is then communicated, via the communication module 151, to the other CPAAS agents 150 for a vote. The status of the plan is assessed at step 680. If the optimisation proposal is rejected by the majority of the CPAAS agents 150 according to the consensus protocol, then a new proposal is generated (at block 660) which is submitted again to a vote. Once the optimisation proposal is accepted, then at step 690 the actions are performed by the actioner 154 of each local leader 1150 involved in the allocation of resources.

In general, the local leader 1150 in each data region 100 is responsible for communicating the operational information of the data region 100 to the global CPAAS agent 150, generating an optimisation proposal when needed, and performing the necessary actions identified in the optimisation plan.

Figure 7:
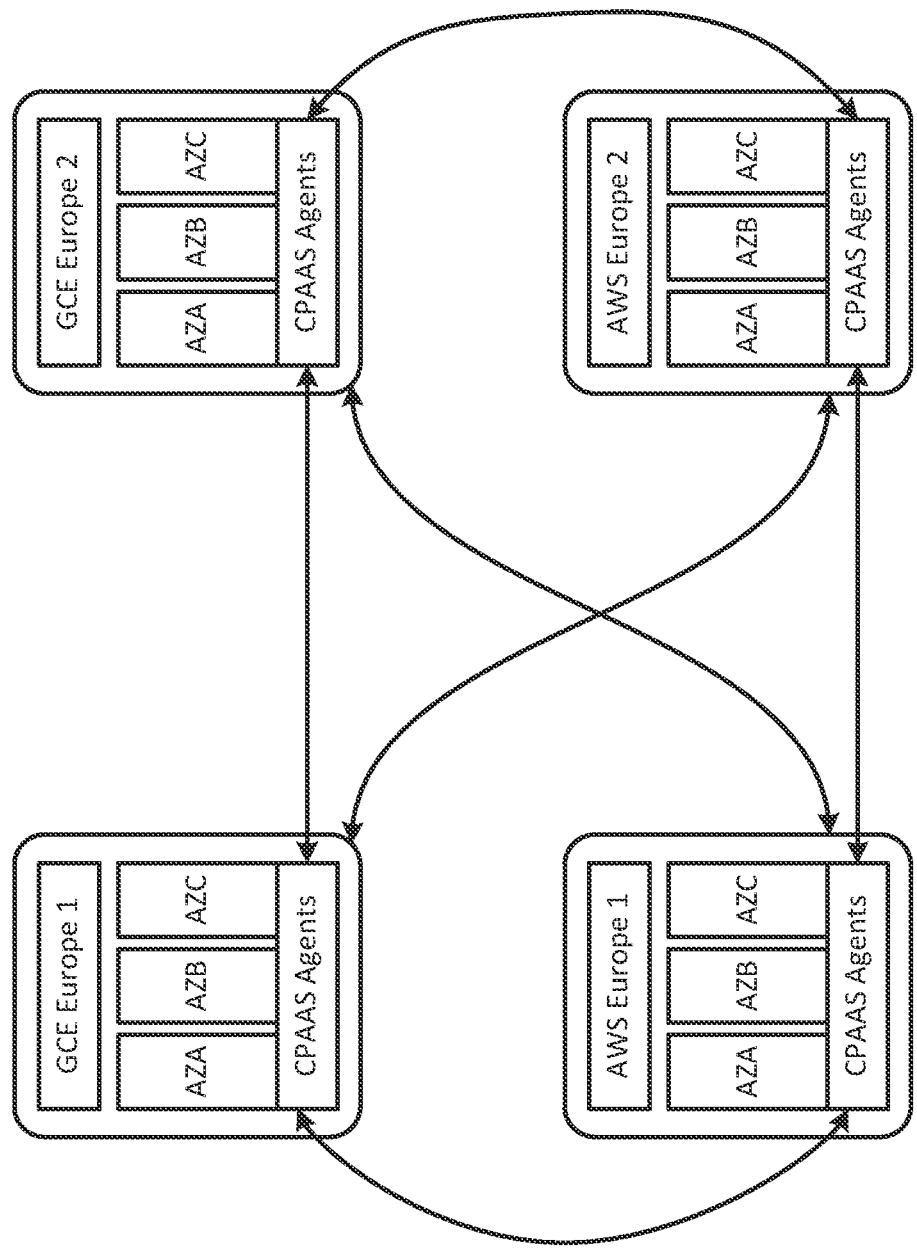
FIG. 7 shows an example of a global duster between local leaders of different data regions according to embodiments of the present invention.
Figure 8:
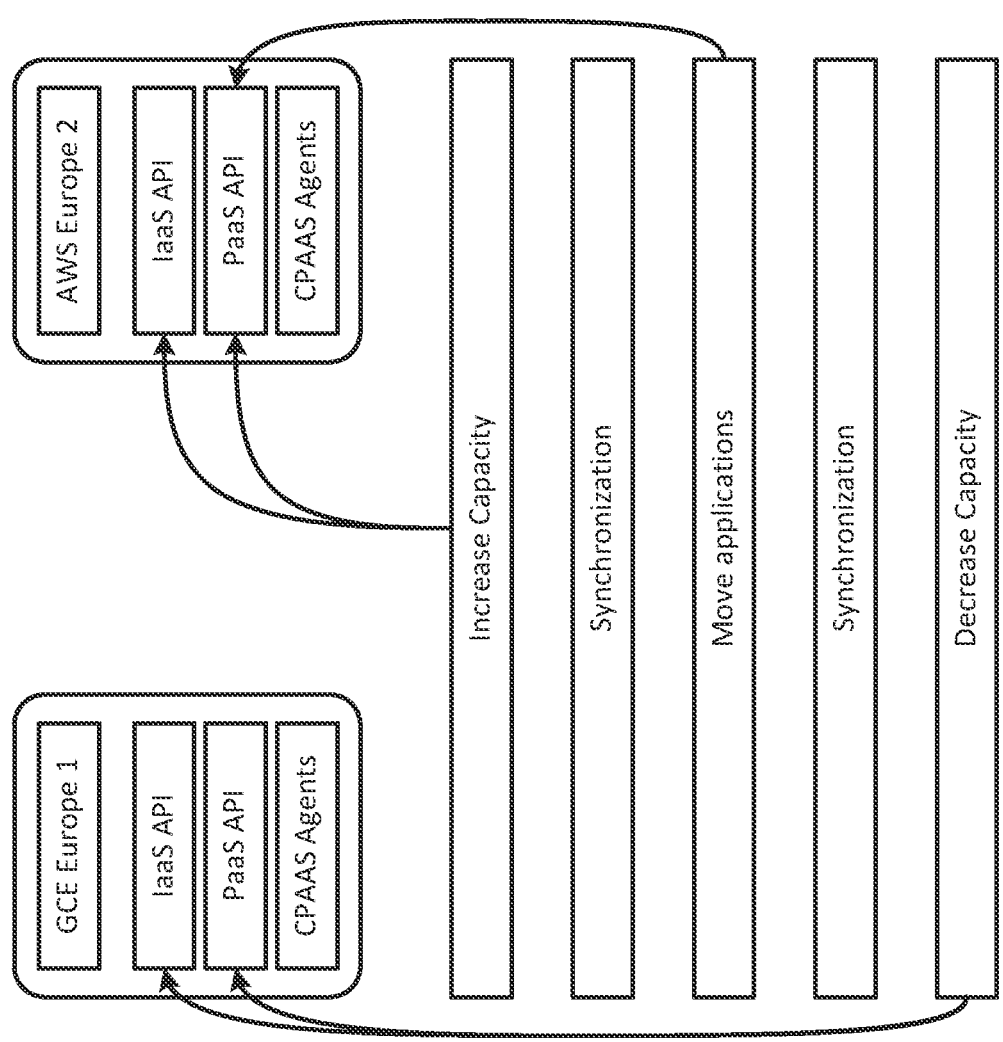
FIG. 8 shows an example of the steps performed for the reallocation of computing resources between different regions.

FIG. 7 shows an exemplified communication between different regions 100 associated with different providers. One of the CPAAS agents 150, e.g. local leader 1150 of provider 1, may be elected as a global leader 11150. In general, the CPAAS agents 150 communicate with one another, and as such, are able to synchronise the actions to be performed in each data region during the reallocation of resources. FIG. 8 shows an example of a reallocation of computing resources between the data region of cloud provider 1 and cloud provider 2. For example, due to a change in the availability or pricing of resources, an optimisation plan is generated for the allocation of resources from the data region of provider 1 to the data region of provider 2. The local leaders 1150 of provider 1 and 2 synchronise and execute the required actions identified in the optimisation plan. For example, in order to ensure continuity of service of the client application, the local leader 1150 of provider 2 starts to increase the required computing capacity for supporting the client application in data regions of provider 2. The corresponding actioner 154 communicates with the corresponding PaaS and IaaS (see FIG. 5) to perform the required actions of increasing availability. Once the increase in capacity has been increased, the local leader 1150 of provider 2 informs the local leader 1150 of provider 2, via the synchronisation step. The local leader 1150 of provider 2 then moves the application components to the VM instances 120 of provider 2, and the application starts to run from the data region 100 of provider 2. Once the application components have been moved and run successfully, the local leader 1150 of provider 1 start decreasing the capacity in the AZ 110 of data region 100 of provider 1.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more, or fewer blocks than those illustrated consistent with embodiments of the invention.

The invention claimed is:

1. A system for managing the allocation of computing resources to a client application in data regions of one or more service providers, each data region comprising a plurality of virtual machine (VM) clusters, each comprising a number of VM instances configured for running at least a component of the client application, the system comprising:

one or more processors;

a plurality of monitoring modules executed by the one or more processors and communicatively coupled with one another, each monitoring module associated with a VM cluster in a data region and configured to monitor a set of operational parameters of the data region operating environment and to collect corresponding operational information from the service provider;

wherein one of the monitoring modules in each data region is selected as a local leader, the local leader is configured to communicate the operational information to the local leaders of the other data regions, wherein one of the local leaders is selected as a global leader, the global leader is configured to synchronise the communication of information between the local leaders and synchronise write operations to a shared operational database configured to store at least the operational information communicated by each of the local leaders and a set of optimisation constraints identifying target values for the operational parameters;

wherein, upon detecting a change in a data region operating environment cause at least one of the operational parameters to violate at least one of the optimisation constraints, each local leader is configured to generate an optimisation proposal comprising a set of actions to be performed by one or more of the local leaders for optimising the allocation of computing resources in the different data regions, the optimisation proposal is submitted to a vote to the local leaders; and wherein, upon the optimisation proposal is accepted by a majority of the local leaders, each local leader identified in the optimisation proposal is configured to perform the corresponding actions in the corresponding data region, otherwise, if the optimisation proposal is rejected, then a new optimisation plan is generated.

2. The system of claim 1, wherein each monitoring module comprises a resource watching module configured to communicate with a cloud service provider to collect the operational information, and accordingly, convert the data format of the collected operational information to a common data format accessible by each of the plurality of monitoring modules.

3. The system of claim 1, wherein the operational information comprises at least one of computing resource availability, architecture of the data region, and pricing of computing resources.

4. The system of claim 1, wherein each monitoring module comprises a resource action module configured to communicate with the corresponding service provider to perform the actions identified in the optimisation plan.

5. The system of claim 1, wherein the actions identified in the optimisation plan comprise at least one of the allocation of new resources, reallocation of computing resources, increase or decrease capacity in a VM cluster, or replace non-performing virtual machine instances in a VM cluster.

6. The system of claim 1, wherein the monitoring module comprises an optimisation module configured for generating an optimisation plan based on the set of optimisation constraints.

7. The system of claim 6, wherein the set of optimisation constraints comprise at least one of a target availability of computing resource in a data region, target pricing of the computing resources, target distribution of computing resources between different regions and/or different VM clusters.

8. The system of claim 6, wherein the optimisation module is configured to obtain the information associated with the optimisation constraints from the shared operational database.

9. The system of claim 6, wherein the optimisation plan is generated based on a cost optimisation function based on a sum of (i) a first parameter proportional to a price associated with the use of all virtual machines, (ii) a second parameter proportional to a difference between an actual number of virtual machines and an expected number of virtual machines, and (iii) a third parameter which is proportional to a rate of change of the number of virtual machines.

10. The system of claim 6, wherein monitoring modules of a data region are organised into a local cluster, and the local leaders of the data regions are organised in a global cluster.

11. The system of claim 10, wherein the communication between the monitoring modules in the local clusters and the global cluster is governed by a distributed consensus protocol.

12. The system of claim 11, wherein the consensus protocol is any one of Paxos, raft, or an equivalent consensus algorithm.

13. The system of claim 11, wherein each local cluster comprises at least three monitoring modules each associated with a corresponding VM cluster.

14. The system of claim 11, wherein each monitoring module comprises a clustering module configured to establish communication with the other monitoring modules in the local and/or global cluster for the exchange of information and implementation of the distributed consensus algorithm.

15. The system of claim 1, wherein at least one of the data regions is associated with a different service provider.

16. The system of claim 1, wherein each monitoring module is instantiated and run in one or more of the VM instances of the corresponding monitored VM cluster.

17. A method for managing the allocation of computing resources to a client application in data regions of one or more service providers, each data region comprising a plurality of virtual machine (VM) clusters, each comprising a number of VM instances configured for running at least a component of the client application, the method comprising:

providing a plurality of monitoring modules communicatively coupled with one another, each monitoring module is associated with a VM cluster in a data region and is configured to monitor a set of operational parameters of the data region operating environment and to collect corresponding operational information from the service provider;

selecting one of the monitoring modules in each data region as a local leader, the local leader is configured to communicate the operational information to the local leaders of the other data regions;

selecting one of the local leaders as a global leader, the global leader is configured for synchronising the communication of information between the local leaders and synchronise write operations to a shared operational database configured to store at least the operational information communicated by each of the local leaders and a set of optimisation constraints identifying target values for the operational parameters;

wherein, upon detecting a change in data region operating environment cause at least one of the operational parameters to violate at least one of the optimisation constraints, each local leader is configured to generate an optimisation proposal comprising a set of actions to be performed by one or more of the local leaders for optimising the allocation of computing resources in the different data regions, the optimisation proposal is submitted to a vote to the local leaders; and wherein, upon the optimisation proposal is accepted by a majority of the local leaders, each local leader identified in the optimisation proposal is configured to perform the corresponding actions in the corresponding data region, otherwise, if the optimisation proposal is rejected, then a new optimisation plan is generated.

* * * * *